Feb. 21, 1939. J. SACHS Re. 21,010

AUTOMATIC CIRCUIT BREAKER

Original Filed July 28, 1922 3 Sheets-Sheet 1

Inventor
Joseph Sachs
By S. Jay Teller
Attorney

Feb. 21, 1939. J. SACHS Re. 21,010

AUTOMATIC CIRCUIT BREAKER

Original Filed July 28, 1922 3 Sheets-Sheet 2

Inventor
Joseph Sachs
By S. Jay Teller
Attorney

Feb. 21, 1939. J. SACHS Re. 21,010

AUTOMATIC CIRCUIT BREAKER

Original Filed July 28, 1922 3 Sheets-Sheet 3

Inventor
Joseph Sachs
By S. Jay Teller
Attorney

Reissued Feb. 21, 1939

Re. 21,010

UNITED STATES PATENT OFFICE 21,010

AUTOMATIC CIRCUIT BREAKER

Joseph Sachs, West Hartford, Conn., assignor to Colt's Patent Fire Arms Manufacturing Company, Hartford, Conn., a corporation of Connecticut Original No. 1,736,372, dated November 19, 1929, Serial No. 303,544, September 1, 1928, which is a division of Serial No. 578,125, July 28, 1922. Application for reissue June 11, 1938, Serial No. 213,302

23 Claims. (Cl. 200—88)

A circuit breaker constructed in accordance with the invention includes an excess current responsive means tending upon the passage of excess current to effect the opening of the circuit, and also includes a manually movable operating member or handle which is adapted to close the circuit after an automatic opening thereof, the said operating member or handle being so connected that it cannot serve to prevent the automatic opening. The said operating member or handle may if desired be arranged to also open and close the circuit for normal switch purposes. In the drawings the circuit breaker is illustrated as forming a part of a meter service installation but it is well adapted for use otherwise.

One object of the present invention is to provide an improved circuit breaker of the type described wherein the excess current responsive means includes two more or less separate electro-responsive devices adapted to be connected in different portions of the circuit and mechanically connected to control circuit opening and closing means comprising two pairs of stationary and movable contacts adapted to be connected respectively in the same different portions of the circuit. As concerns this phase of the invention the two electro-responsive devices may be of the same type or of different types as found preferable, but there are important advantages in electro-thermally responsive devices each of which acts only after a predetermined delay following the attainment of excess current conditions in the corresponding portion of the circuit. The two separate electro-responsive devices when connected in different portions of the circuit, as for instance in the two separate legs thereof, provide protection against excess current conditions existing in one portion or leg of the circuit and not in another.

Another important object of the invention is to provide a circuit breaker of the type described wherein the excess current responsive means is operative by the thermal effect and by the electro-magnetic effect of the current and tends upon the passage of excess current therethrough and as the result of one or both of the said effects to cause the opening of the circuit. It is well known that an electro-magnetic device will act more quickly than an electro-thermal device and therefore by providing both an electro-magnetic device and an electro-thermal device I am enabled to provide for the instantaneous opening of the circuit by the electro-magnetic device when a short circuit exists and to effect the slightly delayed opening of the circuit by means of the electro-thermal device when a moderate overload condition exists.

Another object of the invention is to provide certain improved features and details of mechanical construction providing simplicity of construction and reliability of operation.

Other objects of the invention will be apparent from the following specification and claims.

The application upon which was issued my original Patent No. 1,736,372 was a division of my then copending application for Electric service installation Serial No. 578,125 filed July 28, 1922 issued on December 18, 1928 as Patent No. 1,696,150.

In the accompanying drawings I have shown three embodiments of the invention which have been selected as illustrative thereof. It is to be understood, however, that the construction may be widely varied particularly as to mechanical details without departing from the spirit of the invention as set forth in the claims forming a part of this specification.

Figure 1:
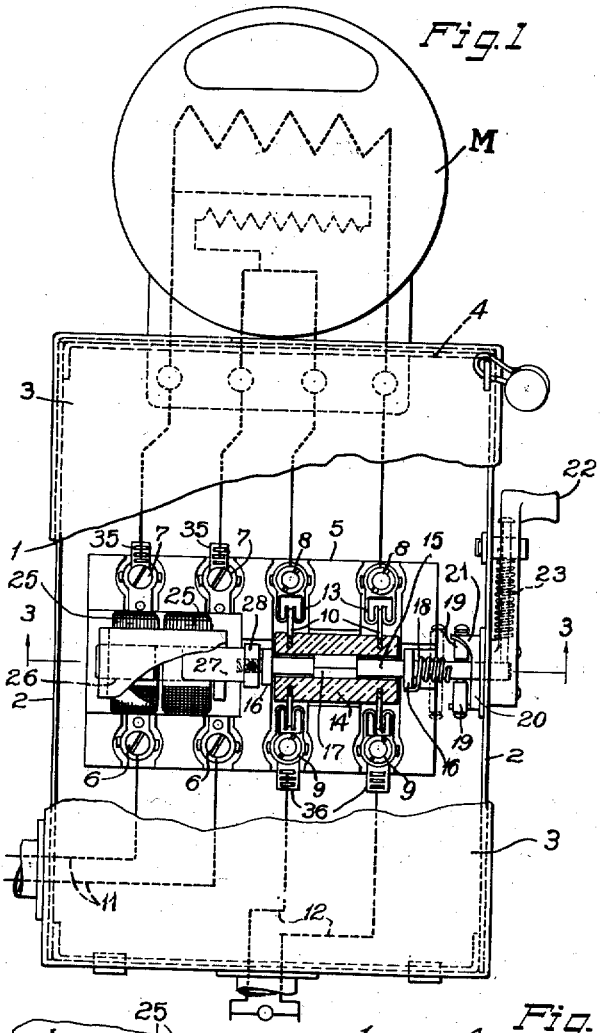
Fig. 1 is a front view of a circuit breaker embodying the invention, this being shown in conjunction with an enclosing cabinet and an electric meter. A portion of the front cover of the cabinet is broken away and a portion of the circuit breaker mechanism is shown in section.

Referring to the drawings it will be observed that the circuit breaker is shown as enclosed in a cabinet 1 having side walls 2, 2 and also having a cover 3 adapted to be sealed in closed position. The said cabinet 1 is provided with one wall, as for instance the upper end wall 4, having or adapted to have an opening therein for protective cooperation with the terminal chamber portion of an electric meter such as M. The relationship between the circuit breaker, the enclosing cabinet, and the meter form no part of the present invention and need not be set forth in further detail, as these features are set forth in detail and claimed in my aforesaid Patent No. 1,696,150.

The cabinet 1 contains an insulating or insulated base 5, preferably though not necessarily made in one piece and secured therein. The base 5 carries the wire terminals 6, 6 connectible with the service wires and wire terminals 9, 9 connectible with the load wires, it being understood that the number of such terminals depends on the number of wires or legs of the circuit for which the apparatus is adapted. In the embodiment of the invention as shown I also provide wire terminals 7, 7 and 8, 8 connectible with wires extending to and from the meter. Movable switch connectors or contacts 10, 10 are connected respectively between the pairs of terminals 8 and 9, the said connectors thus preferably being in the circuit after the meter. Fig. 1 shows the circuit diagram for a common two-wire circuit, the two incoming service wires being marked 11 and the outgoing load or house wires being marked 12. The switch connectors or contacts 10 are movably mounted to bridge and connect the opposed spring clip contacts 13, 13, which are mounted on the base and connected respectively to the terminals 8 and 9. The contacts 10, 10 are movable in opposite directions into and out of engagement with the respective stationary contacts 13, 13. Each connector or contact 10 with its associated contacts 13, 13 or both of the connectors 10 with their respective contacts constitute circuit opening and closing means.

Figure 3:
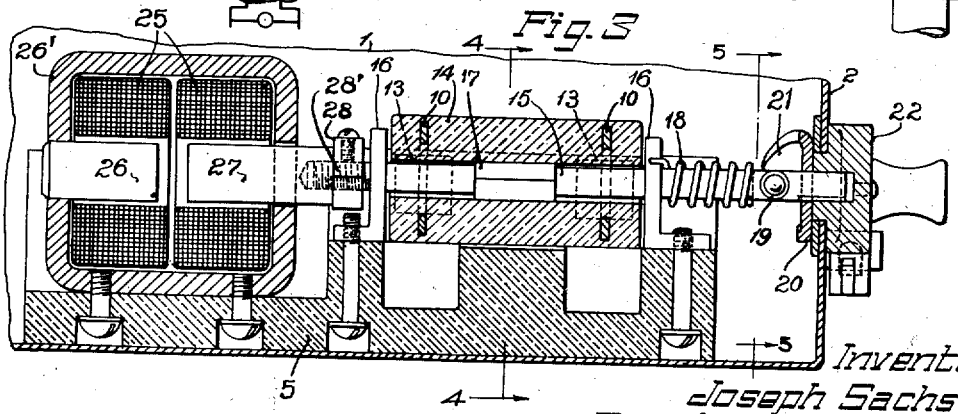
Fig. 3 is an enlarged transverse sectional view taken along the line 3—3 of Fig. 1.
Figure 4:
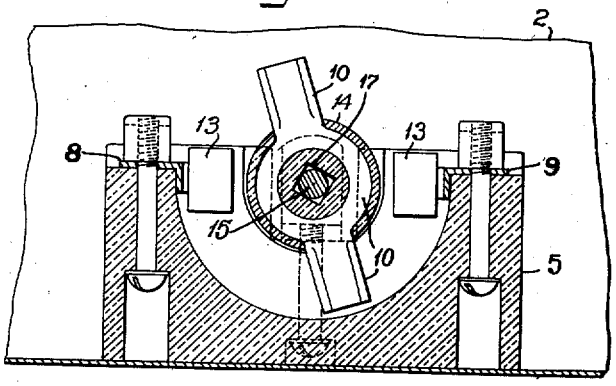
Fig. 4 is an enlarged fragmentary sectional view taken along the line 4—4 of Fig. 3.

The said switch connectors 10 are ring-formed at their centers, as shown in Fig. 4, and both are molded into a hub 14 of insulating material, this hub being mounted on or concentric with a shaft 15 and confined against endwise movement between two upstanding brackets 16, 16 secured to the base 5. The bore of the hub extends through the rings of the connectors and is square or angular in cross-section, and the shaft 15, or at least a portion of it marked 17, conforms to the section so that the hub and its two switch connectors must turn with the shaft but the shaft can slide endwise or axially in the hub. The shaft 15 may be assumed to be journalled in the brackets 16, 16 and to form the support for the hub and connectors, such arrangement being preferred, although it will be apparent that these or their equivalent parts can be otherwise and variously mounted. In its normal position the shaft is pressed outwardly or to the right, to the position indicated in Fig. 3, by a coil spring 18 thrusting at one end on the adjacent bracket 16 and pinned by its other end in a cross hole drilled in the shaft. This spring is under torsional tension as well as under compression, so that besides pressing the shaft outwardly to the position shown, it also tends to turn it on its axis and the direction of such torsional effort is such as to turn the shaft and the switch connectors 10 out of the closed position to the open circuit position shown by the full lines in Fig. 4. The contact 10 is thus biased for automatic movement out of engagement with each of the contacts 13 to open the circuit.

Figure 6:
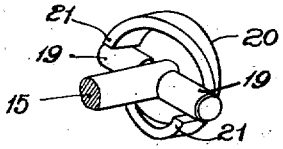
Fig. 6 is an enlarged fragmentary perspective view showing a detail.

By its outward pressure, the spring 18 normally thrusts the roller cross head 19 on the shaft 15 against or toward the disc 20 in which position the said cross head rollers are situated between and bear upon the straight and axially directed edges of two opposed lugs 21 bent up from the edges of the disc, as shown more clearly in Fig. 6. the disc 20 will be recognized from the drawings as forming a part of the hub structure of the outside crank handle or operating member 22, being designed to serve as the means which retains the hub proper in the hole in the box wall which forms the journal seat for the handle. The crank or operating member 22 is movable in opposite directions between an open-circuit position and a closed-circuit position, the open-circuit position being shown by dot-and-dash lines in Fig. 2, and the closed-circuit position being shown by full lines. It will be observed that movement of the crank to its upper position actuates the rock-shaft through the engagement of lugs 21 with rollers 19 and rotates the switch connectors 10 in the direction to close the circuit and against the torsion of spring 18.

The cross head 19 in conjunction with the lugs 21 constitute a releasable latch which resists the circuit-opening bias of the movable contacts when the said contacts and the operating member are in closed-circuit positions but which upon release permits automatic circuit-opening movement of the movable contacts independently of the operating member. The shaft 15 constitutes a wholly mechanical connection which is operable only while the latch remains engaged and which enables the operating member upon movement to its open-circuit or its closed-circuit position to effect corresponding movement of the movable contacts to open or close both portions of the circuit for normal switching purposes.

Figure 2:
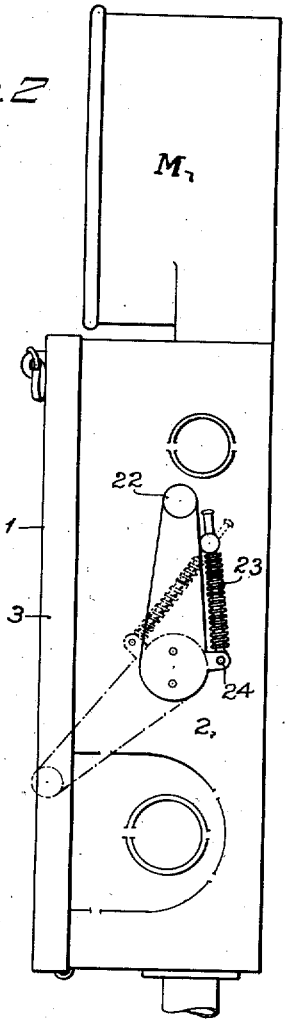
Fig. 2 is a side view of the parts shown in Fig. 1.

Outside the box wall, the handle 22 is subject to the pressure of a spring 23 thrusting at an eccentric point 24 thereon and adapted to be carried past its dead center position as the handle is turned from its upper to its lower position (Fig. 2). This spring imparts a full throw to the handle in both directions and in the handle position corresponding to the closed position of the switch connectors, it exerts sufficient pressure on the handle to resist the torsion of the spring 18 so that although the latter constantly acts in the direction to open the switch, such action is prevented by the counter-force of the handle spring, more or less supplemented by the friction of the parts. When however the handle is turned, such resistance is removed and the spring 18 then acts to turn the shaft and thereby open the circuit. Thus the movement of the handle opens and closes the switch connectors and thereby the handle constitutes the means, accessible to the customer, whereby he may turn the supply current on and off, as required, that is to say, whereby the device serves for general service-switching purposes. The spring 23 is an over-center spring which tends to hold the operating member either in its open-circuit position or in its closed-circuit position. The said spring 23 together with the spring 18 constitute a spring means which normally tends to hold the movable contacts in their closed-circuit positions when the operating member or handle is in its closed-circuit position and which tends to move the movable contacts to their open-circuit positions upon movement of the operating member from its closed-circuit position toward its open-circuit position.

It will observed that the handle 22 can be operated for general service-switching purposes only insofar as its connection is maintained with the rock shaft 15 by means of the coupler device or latch represented by the disc lugs and roller cross-head, and that endwise withdrawal of the shaft so that the rollers 19 are disengaged from the lugs will break the connection and thereby deprive the customer of any control over the switching connectors. Such disengagement is accomplished automatically by the passage of a predetermined or excessive current through the circuit and obviously leaves the shaft unrestrained against the torsion of the spring 18, which thereupon instantly rocks the shaft and opens the circuit. The particular means for thus uncoupling the switch connectors from the customer's control consists of a current-responsive means included in the circuit or influenced by the current therein and arranged to act on the coupling device and which may be variously designed according to the design of the latter. The before described releasable latch 21, 19 or the before described releasable mechanical connection 21, 19, 15 or their mechanical equivalents and the electro-responsive means cooperative therewith may be regarded as controlling means for the movable contact and they will be so referred to.

In the present case as shown in Figs. 1 to 3 such automatic means is an electro-magnet comprising two similarly wound coaxially arranged coils 25 each included in one leg of the circuit, preferably ahead of the meter and between the pairs of terminals 6 and 7 respectively, and jointly creating a magnetic circuit through the internal and external fixed core pieces 26 and 26′ and the movable armature 27, which latter is mounted on or secured to the end of the shaft 15. A collar 28 is supplied at the joint, which may be designed to serve as a stop to limit both the endwise and the rotary movement of the shaft. As shown, the collar 28 has shoulders 28′ of which one is shown in Fig. 3, these shoulders engaging the end of the screw holding the adjacent bracket 16.

Figure 5:
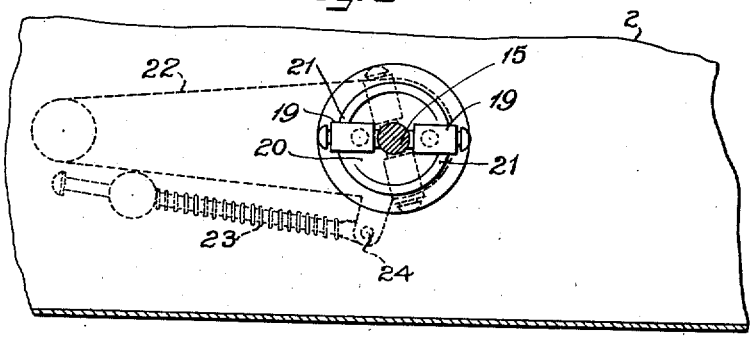
Fig. 5 is an enlarged sectional view taken along the line 5—5 of Fig. 3.

Inasmuch as the coils 25 are permanently included in the circuit and conduct current as long as the switch connectors 10 are closed across the contacts 13, 13 it will be apparent that the armature 27 exerts a normal pull on the shaft in the direction to slide it endwise through its bearings and through the hub 14. This pull is against the endwise thrust of the spring 18 and the latter is selected or adjusted so as to resist the armature pull for all normal and safe current values, yielding only on the passage of a current equal to or in excess of, some predetermined standard of safety. Instantly on such displacement of the shaft, the connector means 10 snap to their open position, the circuit is opened, and the magnetic pull having ceased, the shaft comes to rest with its rollers 19 resting on the sloped sides of the lugs 21, as indicated by the dotted lines in Fig. 5. The two connectors 10, 10 are moved simultaneously, thus opening both legs of the circuit. It will be understood that this opening of both legs of the circuit will occur even though an excessive current is flowing in only one leg. The opening operation takes effect without movement of the customer's or users' service-switching handle 22. In order for the user to close the circuit after an automatic opening thereof, it is only necessary to swing the service-switching handle 22 downwardly in the direction to cause the bevelled lugs 21 to ride under the rollers 19 until the latter snap back into their initial position between the straight edges of the lugs whereupon the switch connectors are again placed under the customer's control and the return of the handle turns the switch connectors to their closed position and the circuit is thus restored. If the cause of the excessive current has not been remedied, it will be quite impossible for the user to complete a closure of the circuit, because the energization of the magnet will continue to repeat the uncoupling action so long as an excessive current passes and the apparatus thus also serves as an indicator to the user of a defective circuit condition.

Figures 7 to 11 represent two of the various possible modifications of the invention as respects the kind of current responsive means used to produce the automatic action. As shown the rock shaft 15, or whatever agency is used for effecting the opening of the circuit, is arranged to be shifted at least in part by the thermal effect of the current. This is done by substituting a thermo-active device in place of the electro-magnet 25, or two thermo-active elements in place of the two coils of the magnet, each element being connected in, or associated with, one of the legs of the circuit, and by arranging them so that the change of form, which results from the heating effect of an excessive current, will move the shaft in the direction to open the coupler or otherwise release the connectors 10 so as to open the circuit. Thermo-active elements for this purpose may be variously shaped and organized with the other parts and can be easily set so as to produce reliable opening action on the attainment of any dangerous or predetermined current values. In the case illustrated each thermal element 29 is constituted of a twin spiral strip of the same kind of bi-metallic material that is commonly used for thermostats. The centers of the two spirals are fixedly mounted on the insulating base block 5 by suitable lugs 30 and 31 which also serve as the wire-connecting means or terminals $6^a$ and $7^a$, and the opposite ends of the two spirals are connected together by a yoke 32 which straddles the extended end $15^a$ of shaft 15, being insulated therefrom by a plate 33 which is adapted to engage cross-pins 34 thereon. By this mounting the current path is from the terminal $6^a$ through the adjacent spiral 29 across the yoke 32 to the other spiral 29 and through the latter to the opposite terminal $7^a$. The heating effect of an excessive current expands the spirals in the direction to uncurl them and thereby causes the yoke 32 to bear, through the insulating plate 33 on the cross-pins 34 in the direction to shift the shaft 15 endwise and open the coupler with the same effect as the electromagnet above described, the shaft however remaining free for rotative movement under the control of the handle. The electro-thermally responsive element 29, while producing the same mechanical result as the magnet, is necessarily delayed in its action by reason of the time needed to bring the element to the required effective temperature.

Figure 7:
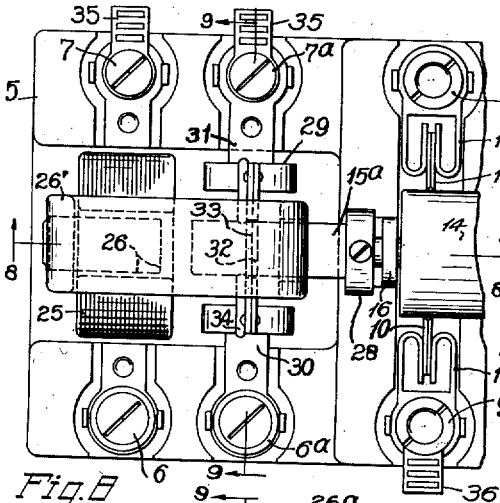
Fig. 7 is an enlarged fragmentary front view somewhat similar to Fig. 1 but showing an alternate embodiment of the invention.
Figure 10:
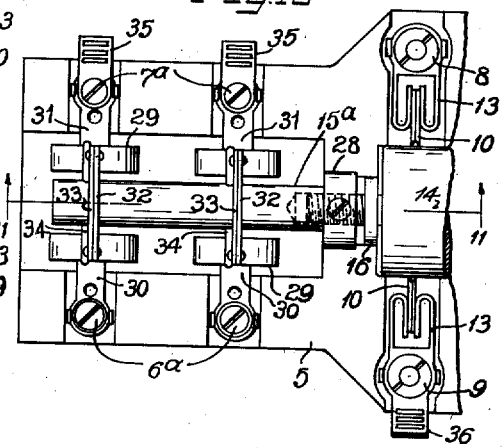
Fig. 10 is a fragmentary front view similar to Fig. 7 but showing another alternate embodiment of the invention.
Figure 8:
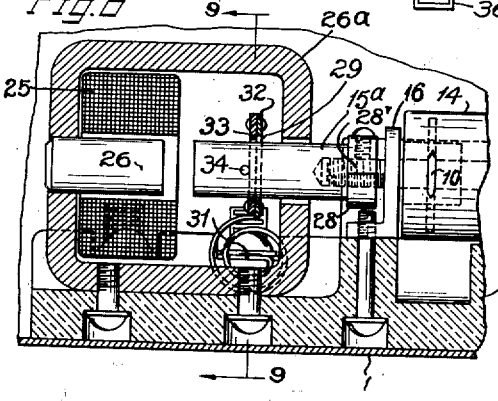
Fig. 8 is a transverse sectional view taken along the line 8—8 of Fig. 7.
Figure 11:
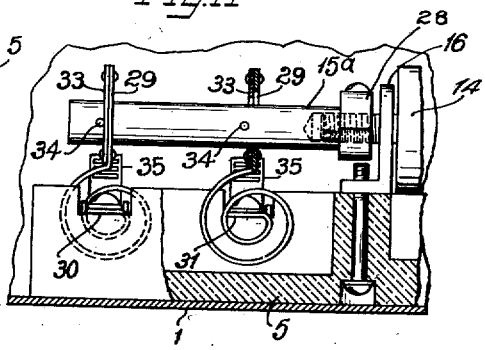
Fig. 11 is a transverse sectional view taken along the line 11—11 of Fig. 10.
Figure 9:
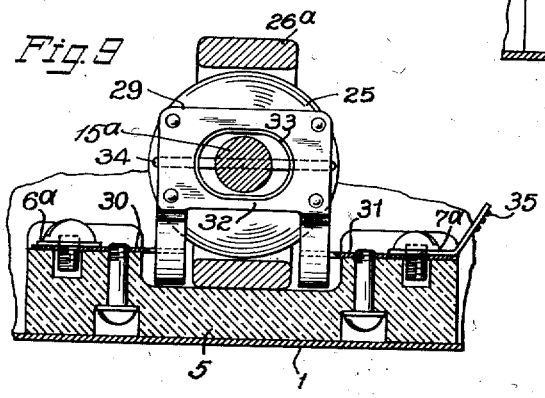
Fig. 9 is a fragmentary sectional view taken along the lines 9—9 of Figs. 7 and 8.

Figs. 7 and 8 show one thermal element substituted for one coil of the magnet whereas Figs. 10 and 11 show two thermal elements substituted respectively for the two coils of the magnet. As shown in Figs. 7 and 8 the magnet and the thermal element cooperate with each other to release the movable contact, the magnet being adapted to act more quickly in the case of a short circuit and the thermal element providing a slightly delayed action in the case of a moderate overload. As shown in Figs. 10 and 11 with one thermal element in each circuit leg magnetic action is entirely eliminated ample power being available from the thermal elements alone to produce reliable action.

Meter test contact 35, 35 and 36, 36 may be provided as shown for facilitating the testing of the meter, but the features of the construction as shown adapting it for use in meter testing are not claimed as a part of the present invention.

What I claim is:

1. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit, spring means normally biasing the movable contacts for automatic movement to open-circuit positions, an operating member manually movable in opposite directions between open-circuit and closed-circuit positions, a releasable latch which resists the circuit-opening bias of the movable contacts when the said contacts and the operating member are in closed circuit positions but which upon release permits automatic circuit-opening movement of the movable contacts independently of the operating member, a wholly mechanical connection which is operable only while the latch remains engaged and which enables the operating member upon movement to its open-circuit or its closed-circuit position to effect corresponding movement of the movable contacts to open or close both portions of the circuit for normal switching purposes, two automatic excess current responsive devices connectible respectively in the aforesaid different portions of the circuit, and means entirely mechanically dependent upon the excess current responsive action of either or both of the last said devices for releasing the latch to permit the aforesaid automatic independent movement of the movable contacts to open both portions of the circuit, the last said means enabling the latch to be automatically re-engaged upon movement of the operating member to open-circuit position so that the operating member may move the movable contacts from open-circuit positions to closed-circuit positions after automatic opening.

2. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit, spring means normally biasing the movable contacts for automatic movement to open-circuit positions, an operating member manually movable in opposite directions between open-circuit and closed-circuit positions, a wholly mechanical operating means normally enabling the operating member upon movement to its open-cicuit or its closed-circuit position to effect corresponding movement of the movable contacts to open or close both portions of the circuit for normal switching purposes, the said operating means including a releasable latch which remains engaged during normal switching movements and which normally resists the circuit-opening bias of the movable contacts when the said contacts and the operating member are in closed-circuit positions but which upon release permits automatic circuit-opening movement of the movable contacts independently of the operating member, two automatic excess current responsive devices connectible respectively in the aforesaid different portions of the circuit, and means entirely mechanically dependent upon the excess current responsive action of either or both of the last said devices for releasing the latch to permit the aforesaid automatic independent movement of the movable contacts to open both portions of the circuit, the last said means enabling the latch to be automatically re-engaged upon movement of the operating member to open-circuit position so that the operating member may move the movable contacts from open-circuit positions to closed-circuit positions after automatic opening.

3. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit, spring means normally biasing the movable contacts for automatic movement to open-circuit positions, an operating member manually movable in opposite directions between open-circuit and closed-circuit positions, a wholly mechanical operating means normally enabling the operating member upon movement to its open-circuit or its closed-circuit position to effect corresponding movement of the movable contacts to open or close both portions of the circuit for normal switching purposes, the said operating means including a releasable latch which moves bodily with the movable contacts and remains engaged during normal switching movements and which normally resists the circuit-opening bias of the movable contacts when the said contacts and the operating member are in closed-circuit positions but which upon release permits automatic circuit-opening movement of the movable contacts independently of the operating member, two automatic excess current responsive devices connectible respectively in the aforesaid different portions of the circuit, and means entirely mechanically dependent upon the excess current responsive action of either or both of the last said devices for releasing the bodily movable latch to permit the aforesaid automatic independent movement of the movable contacts to open both portions of the circuit, the last said means enabling the bodily movable latch to be automatically re-engaged upon movement of the operating member to open-circuit position so that the operating member may move the movable contacts from open-circuit positions to closed-circuit positions after automatic opening.

4. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit, spring means normally biasing the movable contacts for automatic movement to open-circuit positions, an operating member manually movable in opposite directions between open-circuit and closed-circuit positions, a releasable latch which resists the circuit-opening bias of the movable contacts when the said contacts and the operating member are in closed-circuit positions but which upon release permits automatic circuit-opening movement of the movable contacts independently of the operating member, a wholly mechanical connection which is operable only while the latch remains engaged and which enables the operating member upon movement to its open-circuit or its closed-circuit position to effect corresponding movement of the movable contacts to open or close both portions of the circuit for normal switching purposes, two devices connectible respectively in the aforesaid different portions of the circuit and each comprising an electro-thermally responsive element adapted to act automatically and after a predetermined delay following the attainment of excess current conditions in the corresponding portion of the circuit, and means entirely mechanically dependent upon the automatic action of either or both of the said electro-thermally responsive devices for releasing the latch to permit the aforesaid automatic independent movement of the movable contacts to open both portions of the circuit, the last said means enabling the latch to be automatically re-engaged upon movement of the operating member to open-circuit position so that the operating member may move the movable contacts from open-circuit positions to closed-circuit positions after automatic opening.

5. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit, spring means normally biasing the movable contacts for automatic movement to open-circuit positions, an operating member manually movable in opposite directions between open-circuit and closed-circuit positions, a wholly mechanical operating means normally enabling the operating member upon movement to its open-circuit or its closed-circuit position to effect corresponding movement of the movable contacts to open or close both portions of the circuit for normal switching purposes, the said operating means including a releasable latch which remains engaged during normal switching movements and which normally resists the circuit-opening bias of the movable contacts when the said contacts and the operating member are in closed-circuit positions but which upon release permits automatic circuit-opening movement of the movable contacts independently of the operating member, two devices connectible respectively in the aforesaid different portions of the circuit and each including an electro-thermally responsive bi-metallic element adapted to be deflected automatically by heat after a predetermined delay following the attainment of excess current conditions in the corresponding portion of the circuit, and means entirely mechanically dependent upon the excess current responsive deflection of either or both of the said bi-metallic elements for releasing the latch to permit the aforesaid automatic independent movement of the movable contacts to open both portions of the circuit, the last said means enabling the latch to be automatically re-engaged upon movement of the operating member to open-circuit position so that the operating member may move the movable contacts from open-circuit positions to closed-circuit positions after automatic opening.

6. An automatic circuit breaker comprising in combination, two circuit opening and closing means connectible respectively in different portions of the circuit and each comprising two stationary contacts and two movable contacts constituting a bridging connector which is electrically free when disengaged from the stationary contacts, the said bridging connectors being connected for movement in unison in opposite directions into and out of engagement with the stationary contacts to open and close both portions of the circuit and being normally biased for automatic movement to open-circuit positions, an operating member manually movable in opposite directions between open-circuit and closed-circuit positions, a wholly mechanical operating means normally enabling the operating member upon movement to its open-circuit or its closed-circuit position to effect corresponding movement of the bridging connectors to open or close both portions of the circuit for normal switching purposes, the said operating means including a releasable latch which remains engaged during normal switching movements and which normally resists the circuit-opening bias of the bridging connectors when the said connectors and the operating member are in closed-circuit positions but which upon release permits automatic circuit-opening movement of the connectors independently of the operating member, two devices connectible respectively in the aforesaid different portions of the circuit and each including an electro-thermally responsive element adapted to act automatically and after a predetermined delay following the attainment of excess current conditions in the corresponding portion of the circuit, and means entirely mechanically dependent upon the automatic action of either or both of the said electro-thermally responsive devices for releasing the latch to permit the aforesaid automatic independent movement of the bridging connectors to open both portions of the circuit, the last said means enabling the latch to be automatically re-engaged upon movement of the operating member to open-circuit position so that the operating member may move the bridging connectors from open-circuit positions to closed-circuit positions after automatic opening.

7. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit and the said contacts being normally biased for automatic movement to open-circuit positions, handle mechanism comprising a handle manually movable in opposite directions between open-circuit and closed-circuit positions and also comprising an over-center spring tending to hold the handle either in its open-circuit position or in its closed-circuit position, a releasable latch which resists the circuit-opening bias of the movable contacts when the said contacts and the handle are in closed-circuit positions but which upon release permits automatic circuit-opening movement of the movable contacts independently of the handle mechanism, a wholly mechanical connection which is operable only while the latch remains engaged and which enables the handle mechanism upon movement of the handle to its open-circuit or its closed-circuit position to effect corresponding movement of the movable contacts to open or close both portions of the circuit for normal switching purposes, two automatic excess current responsive devices connectible respectively in the aforesaid different portions of the circuit, and means dependent upon the excess current responsive action of either or both of the last said devices for releasing the latch to permit the aforesaid automatic independent movement of the movable contacts to open both portions of the circuit, the last said means enabling the latch to be automatically re-engaged upon movement of the handle to open-circuit position so that the handle mechanism may move the movable contacts from open-circuit positions to closed-circuit positions after automatic opening.

8. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit and the said contacts being normally biased for automatic movement to open-circuit positions, handle mechanism comprising a handle manually movable in opposite directions between open-circuit and closed-circuit positions and also comprising an over-center spring tending to hold the handle either in its open-circuit position or in its closed-circuit position, a wholly mechanical means normally enabling the handle upon movement of the handle to its open-circuit or its closed-circuit position to effect corresponding movement of the movable contacts to open or close both portions of the circuit for normal switching purposes, the last said means including a bodily movable releasable latch which remains engaged during normal switching movements and which normally resists the circuit-opening bias of the movable contacts when the said contacts and the handle are in closed-circuit positions but which upon release permits automatic circuit-opening movement of the movable contacts independently of the handle mechanism, two automatic excess current responsive devices connectible respectively in the aforesaid different portions of the circuit, and means dependent upon the excess current responsive action of either or both of the last said devices for releasing the bodily movable latch to permit the aforesaid automatic independent movement of the movable contacts to open both portions of the circuit, the last said means enabling the latch to be automatically re-engaged upon movement of the handle to open-circuit position so that the handle mechanism may move the movable contacts from open-circuit positions to closed-circuit positions after automatic opening.

9. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit, spring means normally biasing the movable contacts for automatic movement to open-circuit positions, handle mechanism comprising a handle manually movable in opposite directions between open-circuit and closed-circuit positions and also comprising an over-center spring separate from the said biasing spring means and tending to hold the handle either in its open-circuit position or in its closed-circuit position, a wholly mechanical means normally enabling the handle mechanism upon movement of the handle to its open-circuit or its closed-circuit position to effect corresponding movement of the movable contacts to open or close both portions of the circuit for normal switching purposes, the last said means including a bodily movable releasable latch which remains engaged during normal switching movements and which normally resists the circuit-opening bias of the movable contacts when the said contacts and the handle are in closed-circuit positions but which upon release permits automatic circuit-opening movement of the movable contacts independently of the handle mechanism, two automatic excess current responsive devices connectible respectively in the aforesaid different portions of the circuit, and means dependent upon the excess current responsive action of either or both of the last said devices for releasing the bodily movable latch to permit the aforesaid automatic independent movement of the movable contacts to open both portions of the circuit, the last said means enabling the latch to be automatically re-engaged upon movement of the handle to open-circuit position so that the handle mechanism may move the movable contacts from open-circuit positions to closed-circuit positions after automatic opening.

10. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit and the said contacts being normally biased for automatic movement to open-circuit positions, handle mechanism comprising a handle manually movable in opposite directions between open-circuit and closed-circuit positions and also comprising an over-center spring tending to hold the handle either in its open-circuit position or in its closed-circuit position, a releasable latch which resists the circuit-opening bias of the movable contacts when the said contacts and the handle are in closed-circuit positions but which upon release permits automatic circuit-opening movement of the movable contacts independently of the handle mechanism, a wholly mechanical connection which is operable only while the latch remains engaged and which enables the handle mechanism upon movement of the handle to its open-circuit or its closed-circuit position to effect corresponding movement of the movable contacts to open or close both portions of the circuit for normal switching purposes, two devices connectible respectively in the aforesaid different portions of the circuit and each including an electro-thermally responsive bi-metallic element adapted to be deflected automatically by heat after a predetermined delay following the attainment of excess current conditions in the corresponding portion of the circuit, and means entirely mechanically dependent upon the excess current responsive deflection of either or both of the said bi-metallic elements for releasing the latch to permit the aforesaid automatic independent movement of the movable contacts to open both portions of the circuit, the last said means enabling the latch to be automatically re-engaged upon movement of the handle to open-circuit position so that the handle mechanism may move the movable contacts from open-circuit positions to closed-circuit positions after automatic opening.

11. An automatic circuit breaker comprising in combination, two circuit opening and closing means connectible respectively in different portions of the circuit and each comprising stationary and movable contacts, the said movable contacts being connected for movement in unison in opposite directions into and out of engagement with the stationary contacts to open and close both portions of the circuit and the said contacts being normally biased for automatic movement to open-circuit positions, handle mechanism comprising a handle manually movable in opposite directions between open-circuit and closed-circuit positions and also comprising an over-center spring tending to hold the handle either in its open-circuit position or in its closed-circuit position, a wholly mechanical means normally enabling the handle upon movement of the handle to its open-circuit or its closed-circuit position to effect corresponding movement of the movable contacts to open or close both portions of the circuit for normal switching purposes, the last said means including a bodily movable releasable latch which remains engaged during normal switching movements and which normally resists the circuit-opening bias of the movable contacts when the said contacts and the handle are in closed-circuit positions but which upon release permits automatic circuit-opening movement of the movable contacts independently of the handle mechanism, two devices connectible respectively in the aforesaid different portions of the circuit and each including an electro-thermally responsive element adapted to act automatically and after a predetermined delay following the attainment of excess current conditions in the corresponding portion of the circuit, and means entirely mechanically dependent upon the automatic action of either or both of the said electro-thermally responsive devices for releasing the bodily movable latch to permit the aforesaid automatic independent movement of the movable contacts to open both portions of the circuit, the last said means enabling the latch to be automatically reengaged upon movement of the handle to open-circuit position so that the handle mechanism may move the movable contacts from open-circuit positions to closed-circuit positions after automatic opening.

12. An automatic circuit breaker comprising in combination, two circuit opening and closing means connectible respectively in different portions of the circuit and each comprising two stationary contacts and two movable contacts constituting a bridging connector which is electrically free when disengaged from the stationary contacts, the said bridging connectors being connected for movement in unison in opposite directions into and out of engagement with the stationary contacts to open and close both portions of the circuit and being normally biased for automatic movement to open-circuit positions, handle mechanism comprising a handle manually movable in opposite directions between open-circuit and closed-circuit positions and also comprising an over-center spring tending to hold the handle either in its open-circuit position or in its closed-circuit position, a releasable latch which resists the circuit-opening bias of the bridging connectors when the said connectors and the handle are in closed-circuit positions but which upon release permits automatic circuit-opening movement of the bridging connectors independently of the handle mechanism, a wholly mechanical connection which is operable only while the latch remains engaged and which enables the handle mechanism upon movement of the handle to its open-circuit or its closed-circuit position to effect corresponding movement of the bridging connectors to open or close both portions of the circuit for normal switching purposes, two automatic excess current responsive devices connectible respectively in the aforesaid different portions of the circuit, and means dependent upon the excess current responsive action of either or both of the last said devices for releasing the latch to permit the aforesaid automatic independent movement of the bridging connectors to open both portions of the circuit, the last said means enabling the latch to be automatically reengaged upon movement of the handle to open-circuit position so that the handle mechanism may move the bridging connectors from open-circuit positions to closed-circuit positions after automatic opening.

13. An automatic circuit breaker comprising in combination, a circuit opening and closing means, a manually movable operating member, excess current responsive means operative by electro-thermal and electro-magnetic effect, means operatively dependent upon the said current responsive means for automatically operating the said opening and closing means independently of the operating member to open the circuit, and means enabling the operating member to effect the operation of the opening and closing means to close the circuit after automatic opening thereof as aforesaid, the last said means being inoperative to prevent the said automatic excess current responsive opening of the circuit.

14. An automatic circuit breaker comprising in combination, two electric contacts normally in engagement with each other and one of them biased for automatic movement out of such engagement to open the circuit, a controlling means for the movable contact normally operative to prevent the said automatic movement thereof and including two excess current responsive devices one electro-thermal and the other electro-magnetic and each tending upon the passage of excess current therethrough to effect the release of the said movable contact and thereby permit the said automatic circuit opening movement thereof, a manually movable operating member, and means interposed between the operating member and the movable contact enabling the former to return the latter to normal position after an automatic circuit opening movement, the last said means being inoperative to prevent the said automatic excess current responsive circuit opening movement.

15. An automatic circuit breaker comprising in combination, two electric contacts normally in engagement with each other and one of them biased for automatic movement out of such engagement to open the circuit, a controlling means for the movable contact including a releasable latch normally operative to prevent the said automatic movement thereof and also including two excess current responsive devices one electro-thermal and the other electro-magnetic and each tending upon the passage of excess current therethrough to release the latch and thereby permit the automatic circuit opening movement of the movable contact, a manually movable operating member, and means interposed between the operating member and the movable contact enabling the former to return the latter to normal position after an automatic circuit opening movement, the last said means being inoperative to prevent the said automatic circuit opening movement when the latch is released as aforesaid by the controlling means.

16. An automatic circuit breaker comprising in combination, two electric contacts normally in engagement with each other and one of them biased for automatic movement out of such engagement to open the circuit, a releasable mechanical connection normally operative to prevent the said automatic movement of the movable contact, releasing means additional to the mechanical connection and including electro-thermal and electro-magnetic devices connectible in series with each other and with the contacts and each tending upon the passage of excess current therethrough to effect the release of the said mechanical connection and thereby permit the said automatic circuit opening movement of the movable contact, a manually movable operating member, and means interposed between the operating member and the movable contact enabling the former to return the latter to normal position after an automatic circuit opening movement, the last said means being inoperative to prevent the said automatic circuit opening movement when the mechanical connection is released as aforesaid by the releasing means.

17. An automatic circuit breaker comprising in combination, two electric contacts normally in engagement with each other and one of them biased for automatic movement out of such engagement to open the circuit, a controlling means for the movable contact normally operative to prevent the said automatic movement thereof and including two excess current responsive devices one electro-thermal and the other electro-magnetic and each tending upon the passage of excess current therethrough to effect the release of the said movable contact and thereby permit the said automatic circuit opening movement thereof, separate terminals for the said excess current responsive devices whereby they may be connected in different portions of the circuit, a manually movable operating member, and means interposed between the operating member and the movable contact enabling the former to return the latter into engagement with the other contact after an automatic circuit opening movement, the last said means being inoperative to prevent the said automatic excess current responsive circuit opening movement.

18. An automatic circuit breaker comprising in combination, a circuit opening and closing means, a manually movable operating member, excess current responsive means operative by electro-thermal and electro-magnetic effect, means operatively dependent upon the said current responsive means for automatically operating the said opening and closing means independently of the operating member to open the circuit, and means enabling the operating member to effect the operation of the opening and closing means to close the circuit after automatic opening thereof as aforesaid and to effect the operation thereof to both open and close the circuit for normal switching purposes, the last said means being inoperative to prevent the said automatic excess current responsive opening of the circuit.

19. An automatic circuit breaker comprising in combination, two electric contacts normally in engagement with each other and one of them biased for automatic movement out of such engagement to open the circuit, a manually movable operating member, and controlling means for the movable contact including a releasable mechanical connection between the operating member and the movable contact normally operative to prevent the said automatic movement of the latter and enabling the operating member to effect the movement of the movable contact in either direction for the normal opening and closing of the circuit, the said controlling means also including two excess current responsive devices one electro-thermal and the other electro-magnetic and each tending upon the passage of excess current therethrough to act upon the said mechanical connection so as to thereby release the said movable contact and permit the said automatic circuit opening movement thereof independently of the operating member.

20. An automatic circuit breaker comprising in combination, two electric contacts normally in engagement with each other and one of them biased for automatic movement out of such engagement to open the circuit, a manually movable operating member, a releasable mechanical connection between the operating member and the movable contact normally operative to prevent the said automatic movement of the latter and enabling the operating member to effect the movement of the movable contact in either direction for the normal opening and closing of the circuit, and releasing means additional to the said mechanical connection and including two excess current responsive devices one electro-thermal and the other electro-magnetic and each tending upon the passage of excess current therethrough to act upon the said mechanical connection so as to thereby release the said movable contact and permit the said automatic circuit opening movement thereof independently of the operating member.

21. An automatic circuit breaker comprising in combination, two circuit opening and closing means connectible in different portions of the circuit, a manually movable operating member, excess current responsive means operative by electro-thermal and electro-magnetic effect, means operatively dependent upon the electro-thermal effect or the electro-magnetic effect or both of the last said means for automatically operating both of the said opening and closing means independently of the operating member to open the circuit at two places, and means enabling the operating member to effect the operation of both of the opening and closing means to close the circuit after automatic opening thereof as aforesaid and to effect the operation thereof to both open and close the circuit at two places for normal switching purposes, the last said means being inoperative to prevent the said automatic excess current responsive opening of the circuit.

22. An automatic circuit breaker comprising in combination, a shaft movable rotatively and axially, a contact member mounted on the shaft for rotation therewith but held against axial movement therewith, a fixed contact with which the contact portion of the movable contact member normally engages, a manually movable operating member, a mechanical connection between the operating member and the shaft normally enabling the former to rotatively move the latter and thereby move the contact member into or out of engagement with the fixed contact, the said connection being releasable by axial movement of the shaft, means automatically operative upon the release of the mechanical connection as aforesaid for rotating the shaft and the contact member independently of the operating member to disengage the contact member from the fixed contact, and an electro-responsive device connectible in series with the said contacts and serving upon the passage of excess current therethrough to move the shaft axially to effect the said release of the said mechanical connection.

23. An automatic circuit breaker comprising in combination, a shaft movable rotatively and axially, a contact member mounted on the shaft for rotation therewith but held against axial movement therewith, a fixed contact with which the contact portion of the movable contact member normally engages, a manually movable operating member, a mechanical connection between the operating member and the shaft at one side of the said contacts and normally enabling the operating member to move the shaft and thereby move the contact member into or out of engagement with the fixed contact, the said connection being releasable by axial movement of the shaft, means automatically operative upon the release of the mechanical connection as aforesaid for rotating the shaft and the contact member independently of the operating member to disengage the contact member from the fixed contact, and an electro-responsive device connectible in series with the said contacts and connected with the shaft at the opposite side of the said contacts and serving upon the passage of excess current therethrough to move the shaft axially to effect the said release of the said mechanical connection.

JOSEPH SACHS.